United States Patent [19]

Walton, II

[11] 4,239,427

[45] Dec. 16, 1980

[54] BORING TOOL

[75] Inventor: Richard E. Walton, II, Fallston, Md.

[73] Assignee: Black & Decker Inc., Newark, Del.

[21] Appl. No.: 79,858

[22] Filed: Sep. 28, 1979

[51] Int. Cl.[3] .............................................. B23B 51/00

[52] U.S. Cl. .................................... 408/213; 408/214; 408/225; 408/226

[58] Field of Search ............... 408/113, 200, 201, 202, 408/208, 209, 212, 213, 223, 224, 225, 226, 227, 228, 229, 230, 231, 214, 233, 713

[56] References Cited

U.S. PATENT DOCUMENTS

| | | | |
|---|---|---|---|
| 450,908 | 4/1891 | Brede | 408/213 |
| 1,140,988 | 5/1915 | Kunitz | 408/233 |
| 2,643,692 | 6/1953 | O'Brien | 145/126 |
| 3,165,131 | 1/1965 | Mackey | 408/231 |
| 3,945,753 | 3/1976 | Byers | 408/201 |
| 4,090,807 | 5/1978 | Stewart | 408/203 |
| 4,108,567 | 8/1978 | Faber | 408/226 |
| 4,134,706 | 1/1979 | Stewart | 408/213 |

*Primary Examiner*—Harrison L. Hinson
*Attorney, Agent, or Firm*—Leonard Bloom; Edward D. Murphy; Harold Weinstein

[57] ABSTRACT

A boring tool is disclosed for machining holes in various materials which comprises a one piece body have a plurality of cutting members secured thereto in circumferentially spaced relationship. The cutting members are designed so as to enable them to be interchanged between a variety of different diameter bodies, the number of such cutting members increasing with greater diameter bodies. The body is provided with mounting surfaces positioned in such a manner so as to automatically accurately locate the cutting elements with respect to the body and to substantially eliminate any shear loading on the fastening elements securing the cutting members thereto thereby enabling use of only a single fastener element to secure each of the cutting members to the body. The cutting members are preferably circumferentially and radially spaced relative to each other so as to substantially balance the cutting loads thereby assuring positive accurate hole formation.

27 Claims, 10 Drawing Figures

FIG. 1.
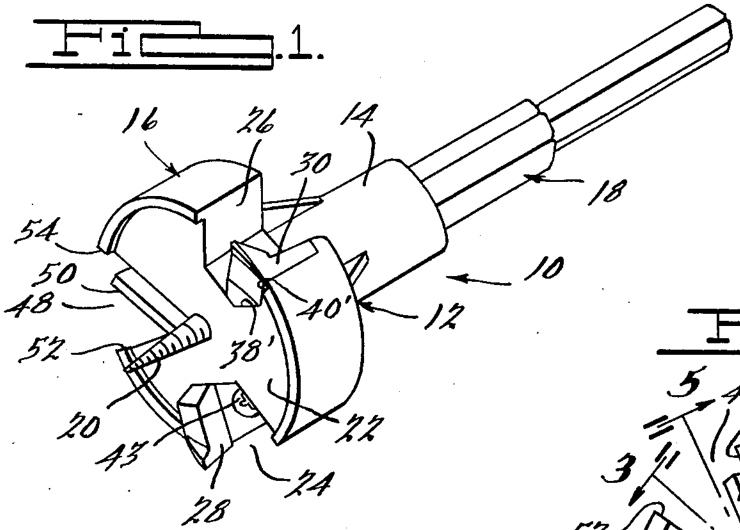
FIG. 2.
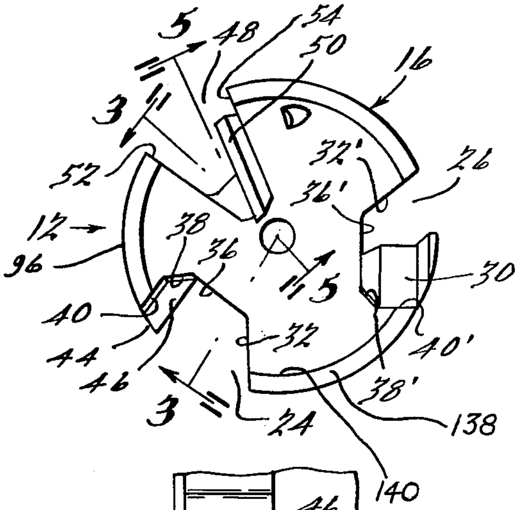
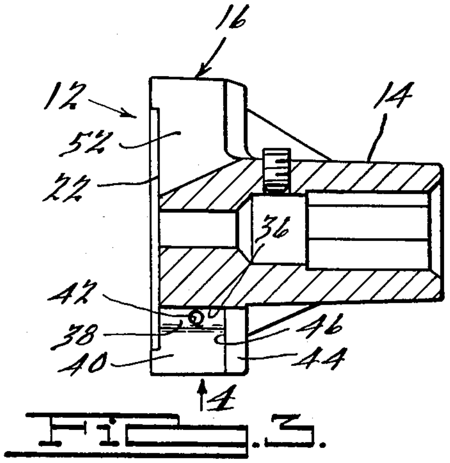
FIG. 3.
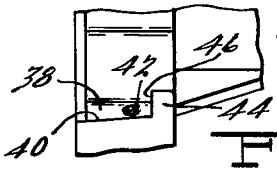
FIG. 4.
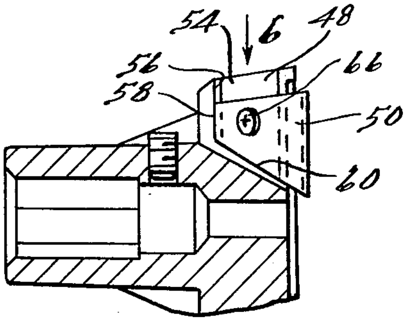
FIG. 5.
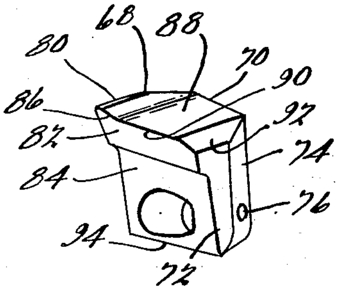
FIG. 7.
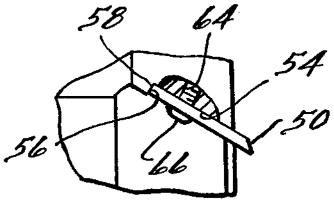
FIG. 6

FIG. 8.
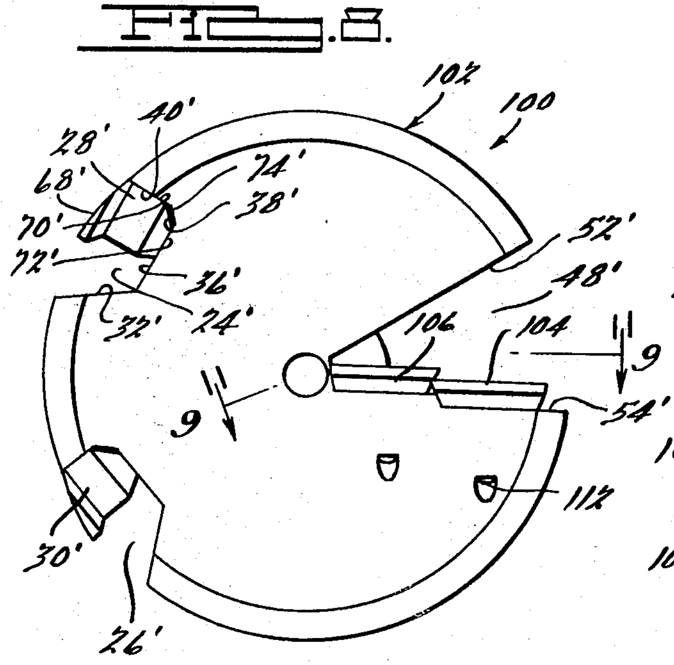
FIG. 9.
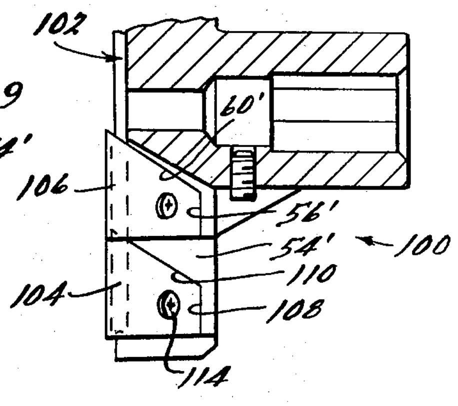
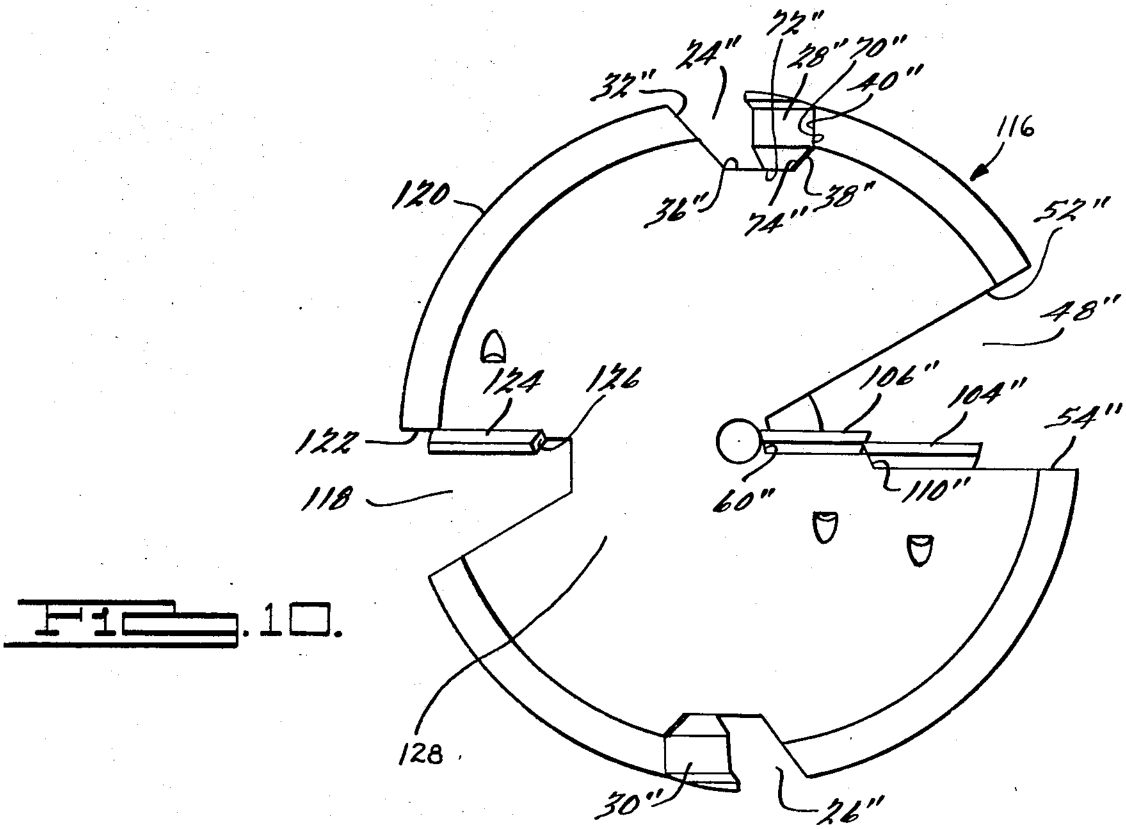
FIG. 10.

BORING TOOL

BACKGROUND AND SUMMARY OF THE INVENTION

This invention relates generally to boring tools and more particularly to self-feeding boring tools specifically designed for use in boring relatively large diameter openings in various materials such as wood for example.

Boring tools of the type generally used for machining relatively large diameter holes in wood and other similar materials commonly include a rotatable drive shaft drivingly secured to a generally cylindrical shaped member having one or more cutting members extending axially outwardly therefrom and a center pilot of self-feeding member. Typically, the cutting members include one or more spur cutters for machining the periphery of the hole and one or more generally radially inwardly extending planer blades for removing the radially inner portions of the workpiece either or both of which may be either in the form of removable cutters secured to a carrier or integrally formed therewith.

As such boring tools are generally driven by portable drill motors and in that it is normally important to insure formation of true, straight accurately located holes, it is desirable that the cutting members be circumferentially positioned so as to balance the loading on the tool around the axis of rotation so as to prevent wandering or walking of the tool during a hole forming operation. Further, as such holes may be machined in workpieces having finished surfaces on both front and back sides, it is desirable that the tool provide a clean smooth entry and exit from the workpiece without splintering or otherwise damaging the area of the workpiece surrounding the opening.

In previous designs it has been common to balance the loading on the boring tool by providing a plurality of substantially identical cutting members symmetrically arranged about the axis of rotation. However, such an arrangement of cutting members requires multiple relatively deep radially extending flutes be provided to clear chips from the work surface. The presence of these multiple flutes reduces the ability of the boring tool to resist sudden breakthrough as the cutting members approach the backside of the workpiece and thus often results in splintering, chipping, or otherwise damaging the surrounding workpiece surface area. Additionally, when sudden breakthrough occurs, substantial time and effort may be required in order to remove the boring tool from the opening, clean up the hole periphery and repair the damage to the backside of the workpiece as normally a substantial number of radially inwardly projecting splinters or fibers remain uncut within the opening after sudden breakthrough.

In other cases, the cutting members are positioned without regard to balancing the radial loading and apparently the pilot means or self-feeding means is relied upon to provide accurate tracking. However, in the event the pilot encounters an irregularity in the workpiece such as a void for example or the cutting members encounter a knot or other irregularity, an out-of-round or misaligned hole may result.

With regard to those boring tools utilizing replaceable cutting members, it has been common practice to provide different size cutting members for each diameter boring tool and to design mounting arrangements requiring removal and reinstallation of multiple fasteners for each cutting member. While this arrangement does enable continued use of the boring tool while one set of cutting members is being sharpened, it requires a substantial investment in replacement blades due to the number of different sizes required to accommodate a set of varying diameter boring tools. Further, the number and variety of spur cutter members required may create a problem into preventing loss or damage thereto when not in use.

The present invention overcomes these disadvantages in providing standard size spur cutters and standard size planer blades for use in boring tools of varying diameters, each boring tool being designed to have a pair of such spur cutters and one or more planer blades secured thereto depending on the diameter hole to be cut secured thereto. Thus, only a relatively small number of spare cutting members are required to insure continuous availability of the boring tool. Further, as each of respective types of cutting members are fully interchangeable from one diameter boring tool to another, the "spares" may be carried on different size boring tools if desired thereby reducing the possibility of the spares being lost or misplaced. The present invention also facilitates cutting member replacement and positioning procedures by providing a mounting arrangement requiring removal of only a single fastener to remove and replace each cutting member and which includes load bearing and seating surfaces which enable the replacement blade to be easily properly positioned. Further, the mounting seats are particularly designed to reduce or eliminate substantially all shear loading on the fastener thereby enabling use of a relatively inexpensive readily available and easily replaceable fastening element. Additionally, the boring tool of the present invention angularly positions each of the cutting members relative to the other cutting members in such a manner as to substantially balance the radially directed loading on the boring tool while also providing substantial surface area on the boring tool which is engageable with the workpiece to resist sudden breakthrough thereby assuring formation of a true accurate hole having relatively clean undamaged surrounding surfaces on both sides of the workpiece.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a boring tool in accordance with the present invention;

FIG. 2 is a bottom plan view of the boring tool of FIG. 1 shown with one of the spur cutters removed therefrom;

FIG. 3 is a sectioned view of the boring tool of FIGS. 1 and 2, the section being taken along line 3—3 of FIG. 2;

FIG. 4 is a view of the boring tool of FIG. 2 as viewed when looking in the direction of arrow 4 in FIG. 3;

FIG. 5 is a section view of the boring tool of FIG. 2, the section being taken along line 5—5 thereof;

FIG. 6 is a view of the boring tool of FIG. 2 as viewed when looking in the direction of arrow 6 of FIG. 5;

FIG. 7 is a perspective view of the spur cutter utilized in the boring tool of FIG. 2, in accordance with the present invention;

FIG. 8 is a bottom plan view of another embodiment of a boring tool in accordance with the present invention similar to that of FIG. 2;

FIG. 9 is a sectioned view of the boring tool of FIG. 8, the section being taken along line 9—9 thereof; and, FIG. 10 is a bottom plan view of yet another embodiment of a boring tool in accordance with the present invention also similar to tha' of FIG. 2.

DESCRIPTION OF THE PREFERRED EMBODIMENTS

Referring now to the drawings and in particular to FIGS. 1 through 6, there is shown a boring tool indicated generally at 10 in accordance with the present invention and comprising a body 12 having a drive shaft receiving portion 14 and a blade carrying portion 16. A driving shaft 18 extends outwardly from portion 14 and is adapted to have a drill motor connected thereto so as to rotationally drive boring tool 10. Self-feeding means 20 is also provided projecting outwardly from surface 22 of blade carrying portion 16.

Blade carrying portion 16 is of a generally cylindrical shape having a diameter preferably slightly smaller than the diameter of the opening boring tool 10 is designed to machine and includes a pair of relatively shallow substantially identical circumferentially spaced radially inwardly extending cutout portions 24 and 26 of an irregular shape generally as shown and defined by axially extending sidewalls 32, 36, 38 and 40. Sidewalls 36 and 40 are disposed generally perpendicular to each other with sidewall 38 extending therebetween. A threaded opening 42 extends inwardly from sidewall 38 preferably at an angle relative to sidewalls 36 and 40 so as to substantially bisect the included angle therebetween. A pair of substantially identical spur cutters 28 and 30 are adapted to be secured within respective cutout portions 24 and 26 by a single threaded fastener 43 extending therethrough and into threaded engagement with opening 42. A flange portion 44 also extends circumferentially outwardly into cutout portions 24 and 26 from sidewall 40 and is spaced axially inwardly from surface 22 so as to provide a seat 46 for spur cutters 28 and 30.

A third relatively deep generally radially inwardly extending cutout portion or flute 48 is also provided in blade carrying portion 16 of body 12 in which a planer blade 50 is secured. Flute 48 is circumferentially spaced from cutout portions 24 and 26 and is defined by generally radially inwardly converging circumferentially leading and trailing sidewalls 52 and 54; sidewall 52 lying in a generally axially extending plane and sidewall 54 being disposed at an acute included angle relative to such axially extending plane. Sidewall 54 has a generally radially inwardly extending step or shoulder 56 axially spaced from surface 22 which is adapted to engage the inner edge 58 of planer blade 50 and provides an axial locating mounting seat therefor. A second shoulder 60 is also provided on surface 54 extending generally radially inwardly and axially outwardly from shoulder 56 and is adapted to engage the radially inner edge 62 of planer blade 50. Shoulders 56 and 60 cooperate to provide quick positive accurate locating and alignment of planer blade 50. A threaded opening 64 is provided in surface 54 which receives a single threaded fastener 66 extending through planer blade 50 to thereby secure it to blade carrying portion 16 of body 12.

Spur cutter 28 is substantially identical to spur cutter 30 and as best seen with reference to FIG. 5, has an irregular shape generally as shown including an arcuate radially outer sidewall portion 88, generally planer sidewall portions 70 and 72 disposed in substantially perpendicular relationship and an interconnecting sidewall portion 74 extending therebetween through which an opening 76 extends which is adapted to accommodate fastener 43. The axially outwardly facing surface of spur cutter 28 has an axially outwardly projecting tapered protrusion or spur 80 which in combination with positively raked portion 82 of leading sidewall surface 84 defines a cutting edge 86 designed to cut the circumference of the opening in the workpiece. A relatively flat blade portion 88 extends radially inwardly from spur 80 and which in combination with surface 82 defines a relatively straight radially extending cutting edge 90. The radially inner edge 92 of blade portion 88 is beveled so as to insure the spur cutter will provide a clean cutting action on the work surface and also to prevent wood fibers from wrapping around the boring tool during operation thereof. It should be noted that if desired blade portion 88 could be continuously sloped if desired thereby eliminating the need for beveled portion 92.

As shown, sidewall surfaces 70 and 72 of spur cutter 28 are designed to engage sidewall surfaces 40 and 36 respectively of opening 24 when spur cutter 28 is secured therein. Preferably, a slight clearance will be provided between sidewall 74 of spur cutter 28 and sidewall 38 of opening 24 so as to insure substantial full load bearing engagement between respective sidewalls 70, 40 and 72, 36. Further, spur cutter 28 also has a generally planer lower surface 94 adapted to be supported on surface 46 of flange portion 44 thereby providing an axial load bearing support. Thus, as can be seen this spur cutter mounting arrangement is designed so as to eliminate substantially all shear loading on threaded fastener 43 thereby enabling use of a single relatively inexpensive readily available fastener for securing spur cutter 28 to blade carrying portion 16 of body 12. Also, sidewalls 70 and 72 and surface 46 of flange portion 44 all cooperate to accurately position the spur cutter relative to body 12.

In use, feed screw 12 will operate to advance the boring tool into the workpiece in response to rotational driving forces transmitted from a suitable drill motor via drive shaft 18. As feed screw 20 draws the spur cutters into engagement with the workpiece, a groove will be cut around the periphery of the opening by protrusion 80 thereby providing a smooth clean sidewall surface on the opening thus formed in the workpiece. It should be noted that arcuate surfaces 68 of spur cutters 28 and 30 are positioned slightly radially outwardly from sidewall 96 of blade carrying portion 16 so as to provide clearance therefor within the machined opening.

As boring tool 10 continues to advance, cutting edges 90 will be drawn into engagement with that portion of the workpiece disposed radially inwardly from protrusion 80 and will operate to machine away same, wood chips thus produced being evacuated from the area through respective cutout portions 24 and 26. Planer blade 50 will also preferably be positioned so as to engage the workpiece at approximately the same time as cutting edges 90 and will operate to machine away that portion of the workpiece lying between feed screw 20 and cutting edges 90, the chips produced thereby being evacuated through flute 48. It should be noted that in order to assure the entire surface area of the opening being formed by the boring tool of the present invention is properly machined, the arcs swept by the radially inner edge 92 of spur cutters 28 and 30 and the radially outer edge of planer blade 50 will be overlapped slightly.

As previously mentioned, each of the spur cutters 28 and 30 and the planer blade 50 are secured to blade carrying portion 16 in circumferentially spaced relationship. In order to provide positive accurate tracking of the boring tool, particularly during initial engagement of the spur cutters and planer blade with the workpiece, it is desirable to control the relative angular spaced position of these spur cutters 28 and 30 and planer blade 50 so as to produce a vectorial summation of the respective loading forces encountered by each of the spur cutters 28 and 30 and planer blade 50 which is substantially equal to zero. This is accomplished in the present invention by angularly positioning the respective spur cutters 28 and 30 and planer blade 50 relative to each other such that when each of the loading forces exerted on the respective cutting members by the workpiece is resolved into a force-couple system with the resolved force being translated so as to be considered as acting at the center of the axis of rotation, the vectorial summation of these resolved forces will be substantially equal to zero and the resulting couples will all be of equal sign and thus additive. The loading encountered by each of the spur cutters and the planer blade will depend on several factors including the type of material to be machined, the width and depth of cut and the relative angulation of the blade relative to the work surface. Thus, if the cutting loads are sufficiently balanced that substantially no lateral forces are exerted on the feed screw assuming uniform density material, the ability of the feed screw to resist the temporary unbalancing encountered should a portion of non-uniform density material be encountered during a portion of a cutting operation will be significantly improved with the result that the boring tool will be better able to provide a true accurate straight opening through the workpiece.

Additionally, it should also be noted that the boring tool 10 of the present invention utilizes a pair of spaced spur cutters 28 and 30 in combination with a planer blade 50 and thus only a single flute 48 is required extending radially inwardly approximately to the center of the body 12. Thus, a substantial supporting surface area of body 12 lies diametrically opposed to the flute 48 as well as immediately adjacent thereto which supporting surface area will operate to engage the work surface and thereby substantially reduce the possibility of sudden breakthrough of the boring tool at the end of the machining operation.

It is noted that the boring tool 10 rotates in the counter-clockwise direction when viewed as in FIG. 2 so that spur cutter 30 is the leading spur cutter and spur cutter 28 (FIG. 1) is the trailing spur cutter. The trailing spur-cutter 28 is seated in carrying portion 16 so as to project further above the surface 138 of curb portion 140 than the lead spur cutter 30. The difference in elevation between the two spur cutters is arrived at empirically for a particular cutting tool of a given diameter and is selected to help achieve a balancing of the cutting load on the entire tool by making the chip loads which the respective spur cutters encounter approximately the same. This difference in elevation can be up to approximately twenty (20%) percent of the cutting depth of the cutting edge 32 above the surface 138 of curb portion 140.

Referring now to FIGS. 8 and 9, another embodiment of the present invention is illustrated being indicated generally at 100. Boring tool 100 is similar to boring tool 10 described above but is designed to provide an opening of a larger diameter. Accordingly, a blade carrying portion 102 is provided which is similar to blade carrying portion 16 of boring tool 10 and hence corresponding portions thereof are indicated by like numbers primed. However, in this embodiment a pair of substantially identical planer blades 104 and 106 are secured in radially spaced slightly overlapping relationship within flute 48′. Accordingly, a second pair of shoulders or steps 108 and 110 are provided on surface 54′ of flute 48′ corresponding to shoulders 56′ and 60′ respectively and spaced radially outwardly and slightly circumferentially therebehind. A second opening 112 is also provided which is adapted to receive fastener 114 for securing planer blade 104 in position on blade carrying portion 102. Similarly to boring tool 10 the relative angular positioning of spur cutters 28′ and 30′ with respect to planer blades 108 and 110 is selected in substantially the same manner as set forth above with regard to boring tool 10 so as to provide a balanced load on the boring tool 100 with the summation of the resultant force vectors acting at the center of the axis of rotation being substantially equal to zero.

Referring now to FIG. 10, another embodiment of a boring tool 116 in accordance with the present invention is shown which is designed for machining openings of even larger diameters. Boring tool 116 is also similar in construction to boring tools 10 and 100 and accordingly corresponding portions thereof are indicated by like numbers double primed. However, in this embodiment, an additional cutout portion 118 of a radial depth intermediate that of flute 48″ and cutout portions 24″ and 26″ is provided on blade carrying portion 120. A pair of shoulders or steps similar to those provided in flute 48 are provided in surface 122 of cutout portion 118 so as to position and support planer blade 124 with respect to blade carrying member 120. Planer blade 124 is also similar to planer blades 108 and 110 although the radially inner corner 126 thereof is beveled so as to provide a clean cut and prevent wood fibers from wrapping around and possibly interfering with the cutting action of the boring tool. Planer blade 124 is secured to blade carrying portion 120 by a single fastener in substantially identical manner as described above.

It should be noted that the loading forces encountered by the spur cutters 28″ and 30″, planer blades 108″ and 110″ and planer blade 124 are all substantially balanced by the relative angular positioning thereof in like manner as described above such that the resultant vector summation of the resolved forces acting at the axis of rotation is substantially equal to zero. Further, as previously described, the spur cutter mounting arrangement is designed such that shear loading on the fastener elements is substantially eliminated.

With the embodiment of FIG. 10, the possibility of a sudden breakthrough of the boring tool 116 at the end of the machining operation is substantially reduced because the opening of flute 118 does not extend the entire radial distance to the axis of rotation of the tool thereby leaving the surface portion 128 of blade carrying portion 120 for engaging the surface of the base of the bore being cut into the workpiece.

It should be noted that each of the spur cutters are substantially identical for each of the different size boring tools as are the mounting provisions therefor. Similarly, each of the planer blades are substantially identical except for planer blade 124. Thus, various size boring tools may be easily provided by utilizing a suitable number of planer blades. The number of such substantially identical planer blades required for a given diameter boring tool will be approximately equal to an integer having a value equal to or greater than the radius of the opening to be cut less the width of the groove cut by the spur cutters divided by the width of the planer blade less a factor to allow for overlap of the cutting edges.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a boring tool for cutting a generally circular hole including a generally cylindrical shaped body of a predetermined diameter, a driving shaft extending axially outwardly from one side of said body for rotationally driving said body, said boring tool further including at least one spur cutter secured to said body and operative to cut a ring of a predetermined width, and a predetermined number of substantially identical planer blades secured to said body, each of said planer blades having a predetermined cutting width, said predetermined number being an integer substantially equal to or greater than the radius of said body portion less said predetermined width divided by said predetermined cutting width.

2. A boring tool as set forth in claim 1 wherein said boring tool includes a pair of spur cutters secured to said body in circumferentially spaced relationship, each of said spur cutters being substantially identical.

3. A boring tool as set forth in claim 1 wherein each of said planer blades are secured to said body in slightly overlapping relationship so as to insure substantially complete cutting of said hole.

4. In a boring tool for cutting a generally circular hole including a generally cylindrical shaped body of a predetermined radius, a driving shaft extending axially outwardly from one side of said body for rotationally driving said body, said boring tool further including spur cutter means secured to said body and operative to cut a ring of a predetermined width, said body including a cutout portion opening radially outwardly, spur cutter mounting means provided within said cutout portion for mounting said spur cutter to said body, said spur cutter mounting means include first and second axially extending mounting surfaces disposed at a predetermined included angle relative to each other and a fastening element for fastening said spur cutter to said body, said fastening element extending through said spur cutter and into engaging relationship with said body at an angle substantially bisecting said included angle, and a predetermined number of substantially identical planer cutter means secured to said body, each of said planer cutter means having a predetermined cutting width, said predetermined number being an integer approximately equal to or greater than said radius of said body portion less said predetermined width divided by said predetermined cutting width.

5. A boring tool as set forth in claim 4 wherein said boring tool further includes a second cutout portion opening radially outwardly, a second spur cutter and second spur cutter mounting means disposed within said second cutout portion, said second mounting means including first and second axially extending mounting surfaces disposed at a predetermined included angle relative to each other and a fastening element for fastening said spur cutter to said body, said fastening element extending through said spur cutter and into engaging relationship and said body at an angle substantially bisecting said included angle.

6. A boring tool as set forth in claim 5 wherein each of said cutout portions is provided with a flange portion having an axially facing surface engageable with one of said spur cutters and operative to axially support and locate said one of spur cutters with respect to said body.

7. A boring tool as set forth in claim 6 wherein each of said first and second mounting surfaces of said first and second spur cutter mounting means cooperate with respective of said spur cutters to substantially eliminate shear loading on said fastening element.

8. A boring tool as set forth in claim 5 wherein said predetermined number of planer blades are secured to said body in circumferentially spaced relationship relative to each of said spur cutters.

9. A boring tool as set forth in claim 8 wherein each of said spur cutters and said predetermined number of planer blades are angularly positioned relative to each other such that when the cutting forces acting thereon are each resolved into a force-couple system with the force being transformed to a resultant force acting at the center of the axis of rotation plus a couple, the vectorial summation of said resultant forces will be substantially equal to zero.

10. In a boring tool for cutting a generally circular hole of a predetermined radius in a workpiece including a generally cylindrically shaped body, a driving shaft extending axially outwardly from one side of said body for rotationally driving said body, said boring tool further including first cutter means secured to said body and operative to cut a ring of a predetermined width substantially less than said predetermined radius in said workpiece and a predetermined number of substantially identical second cutter elements secured to said body, each of said second cutter elements being operative to cut a ring of a second predetermined width in said workpiece, said predetermined number being sufficient to provide a total cutting width at least equal to said predetermined radius, said total cutting width being approximately equal to the sum of said first predetermined cutting width and the product of said second predetermined cutting width and said predetermined number.

11. In a self-feeding boring tool for boring a circular hole in a workpiece having a generally cylindrical body, an elongated shaft extending axially outwardly from one end of said body, self-feeding means extending axially outwardly from the opposite side of said body, said body having a plurality of radially outwardly opening cutout portions spaced around the periphery thereof, at least one peripheral cutting means, and mounting means provided within one of said cutout portions for enabling said peripheral cutting means to be secured to said body, said mounting means comprising a first surface on said body defining a first axially extending plane disposed in generally spaced parallel relationship to an axially extending plane passing through the rotational axis of said body, a second surface spaced from said first surface and defining a second axially extending plane disposed at a predetermined included angle relative to said first plane, and fastening means for securing said peripheral cutting means in engaging relationship with said first and second surfaces, said fastening means extending into said body at an angle so as to substantially bisect said predetermined included angle whereby shear loading on said fastening means is substantially eliminated.

12. A self-feeding boring tool as set forth in claim 11 further comprising a flange portion extending into said cutout portion and having an axially outwardly facing surface adapted to engage said peripheral cutting means so as to axially support and locate same.

13. A self-feeding boring tool as set forth in claim 12 wherein said axially facing surface and said first and second mounting surfaces cooperate to substantially eliminate shear loading on said fastening element.

14. A self-feeding boring tool as set forth in claim 13 wherein said fastening element comprises a single threaded screw.

15. In a boring tool for cutting a generally circular hole in a workpiece having a generally cylindrical body, a driving shaft extending axially ourwardly from one side of said body, said body having a cutout portion opening radially outwardly, peripheral cutting means, and mounting means within said cutout portion for mounting said peripheral cutting means with a portion of said peripheral cutting means projecting axially outwardly from the opposite side of said body, said mounting means comprising first and second axially extending mounting surfaces disposed at a predetermined included angle relative to each other and a fastening element for fastening said peripheral cutter to said body, said fastening element extending through said peripheral cutter and engaging said body at an angle substantially bisecting said included angle.

16. A boring tool as set forth in claim 15 wherein said peripheral cutting means has first and second surfaces provided thereon, said first and second surfaces being adapted to supportingly engage said first and second mounting surfaces.

17. A boring tool as set forth in claim 15 further comprising a flange portion extending into said cutout portion and having an axially outwardly facing surface adapted to engage said peripheral cutting means so as to axially support and locate same.

18. A boring tool as set forth in claim 17 wherein said axially facing surface and said first and second mounting surfaces cooperate to substantially eliminate shear loading on said fastening element.

19. A boring tool as set forth in claim 15 further comprising a third mounting surface provided on said body and extending between said first and second mounting surfaces, said fastening element threadedly engaging a threaded opening provided in said third mounting surface.

20. A boring tool as set forth in claim 19 wherein said peripheral cutting means has first and second surfaces provided thereon, said first and second surfaces being adapted to supportingly engage said first and second mounting surfaces, and a third surface adapted to be spaced from said third mounting surface when said peripheral cutting means is secured to said body.

21. A boring tool as set forth in claim 19 further comprising a flange portion extending into said cutout portion and having an axially outwardly facing surface adapted to engage said peripheral cutting means so as to axially support and locate same.

22. A boring tool as set forth in claim 21 wherein said axially facing surface and said first and second mounting surfaces cooperate to substantially eliminate shear loading on said fastening element.

23. In a self-feeding boring tool for boring a circular hole in a workpiece having a generally cylindrical body, an elongated shaft extending axially outwardly from one end of said body, self-feeding means extending axially outwardly from the opposite side of said body, said body having a plurality of radially outwardly opening cutout portions spaced around the periphery thereof, at least one peripheral cutting means, and mounting means provided within one of said cutout portions for enabling said peripheral cutting means to be secured to said body, said mounting means comprising a first surface on said body defining a first axially extending plane disposed in generally spaced parallel relationship to an axially extending plane passing through the rotational axis of said body, a second surface spaced from said first surface and defining a second axially extending plane disposed at a predetermined included angle relative to said first plane, and fastening means for securing said peripheral cutting means in engaging relationship with said first and second surfaces, said fastening means extending into said body at an angle so as to substantially bisect said predetermined included angle whereby shear loading on said fastening means is substantially eliminated, and a planer blade circumferentially spaced from said peripheral cutting means and adapted to cut another radially inwardly disposed portion of said hole, said peripheral cutting means and said planer blade being subjected to a loading force resulting from cutting engagement with said workpiece and being angularly positioned relative to each other such that when each of said loading forces are resolved into a force-couple system comprising a resolved force acting substantially at the center of the axis of rotation and a couple, the vectorial summation of said resolved forces is substantially equal to zero whereby radial loading on said self-feeding means is substantially eliminated.

24. In a boring tool for boring generally circular holes in a workpiece including a generally cylindrical body, guide means provided on said body and positioned coaxially with the axis of rotation of said boring tool, a pair of spur cutters secured to the periphery of said body in circumferentially spaced relationship and adapted to cut a portion of said hole of a predetermined radial width, a planer blade circumferentially spaced from each of said spur cutters and adapted to cut another radially inwardly disposed portion of said hole, said spur cutters and said planer blade being subjected to a loading force resulting from cutting engagement with said workpiece and being angularly positioned relative to each other such that when each of said loading forces are resolved into a force-couple system comprising a resolved force acting substantially at the center of the axis of rotation and a couple, the vectorial summation of said resolved forces is substantially equal to zero whereby radial loading on said guide means is substantially eliminated.

25. A boring tool as set forth in claim 24 wherein said boring tool further comprises a plurality of said planer blades, each of said planer blades being secured to said body in circumferentially and radially spaced relationship so as to define radially spaced cutting arcs upon rotation of said boring tool, each of said plurality of planer blades being subject to a cutting loading force resulting from cutting engagement with said workpiece, each of said cutting forces being resolvable into a force-couple system comprising a resolved force acting at the center of the axis of rotation of said cutting tool and a couple, the vectorial summation of said resolved forces of each of said plurality of planer blades and of each of said spur cutters being substantially equal to zero whereby said cutting loading forces are substantially balanced.

26. In a boring tool for boring generally circular holes of a predetermined radius in a workpiece including a generally cylindrical body, guide means provided on said body and positioned coaxially with the axis of rotation of said boring tool, a pair of spur cutters secured to the periphery of said body in circumferentially spaced relationship and adapted to cut a portion of said hole of a first predetermined radial width, a predetermined number of substantially identical planer blades circumferentially spaced from each other and from each of said spur cutters, each of said planer blades being adapted to cut another radially inwardly disposed portion of said workpiece of a second predetermined width, said predetermined number being sufficient to provide a total cutting width at least equal to said predetermined radius, said total cutting width being approximately equal to the sum of said first predetermined cutting width and the product of said second predetermined width and said predetermined number, said spur cutters and each of said planer blades being subjected to a loading force resulting from cutting engagement with said workpiece and being angularly positioned relative to each other such that when each of said loading forces are resolved into a force-couple system comprising a resolved force acting substantially at the center of the axis of rotation and a couple, the vectorial summation of said resolved forces is substantially equal to zero whereby radial loading on said guide means is substantially eliminated.

27. In a boring tool for boring generally circular holes of a predetermined radius in a workpiece including a generally cylindrical body, guide means provided on said body and positioned coaxially with the axis of rotation of said boring tool a plurality of radially outwardly opening circumferentially spaced cutout portions provided in said body, mounting means provided within selected ones of said cutout portions, said mounting means comprising a first supporting surface defining a first axially extending plane disposed in generally spaced parallel relationship to an axially extending plane passing through the axis of rotation of said body, a second supporting surface spaced from said first surface and defining a second axially extending plane disposed at a predetermined included angle relative to said first plane, a pair of spur cutters, fastening means for securing each of said pair of spur cutters within said selected ones of said cutout portions and in engaging relationship with said first and second surfaces, said fastening means extending into engagement with said body at an angle so as to substantially bisect said included angle whereby shear loading on said fastening means is substantially eliminated, said spur cutters being positioned and adapted to cut a portion of said hole of a first predetermined radial width, a predetermined number of substantially identical planer blades circumferentially spaced from each other and from each of said spur cutters, each of said planer blades being adapted to cut another radially inwardly disposed portion of said workpiece of a second predetermined width, said predetermined number being sufficient to provide a total cutting width at least equal to said predetermined radius, said total cutting width being approximately equal to the sum of said first predetermined cutting width and the product of said second predetermined width and said predetermined number, said spur cutters and each of said planer blades being subjected to a loading force resulting from cutting engagement with said workpiece and being angularly positioned relative to each other such that when each of said loading forces are resolved into a force-couple system comprising a resolved force acting substantially at the center of the axis of rotation and a couple, the vectorial summation of said resolved forces is substantially equal to zero whereby radial loading on said guide means is substantially eliminated.

* * * * *